No. 853,502. PATENTED MAY 14, 1907.
E. W. DOWD.
RAKE.
APPLICATION FILED AUG. 31, 1906.
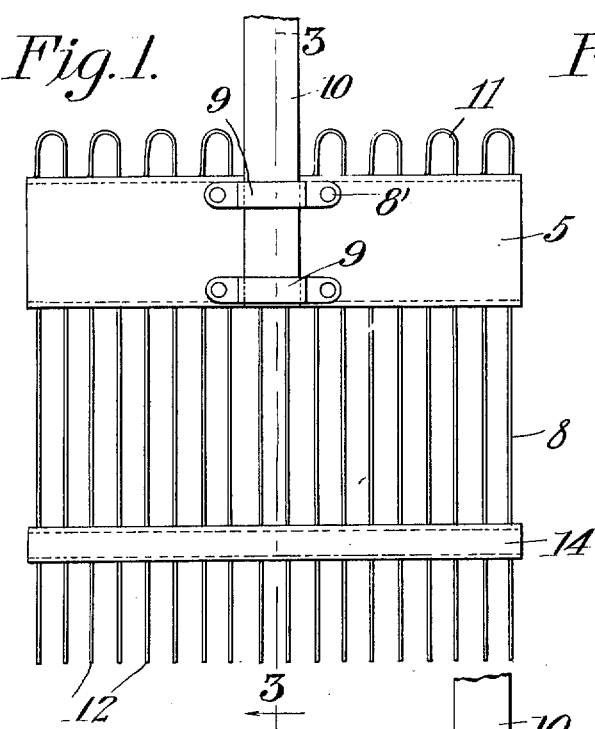
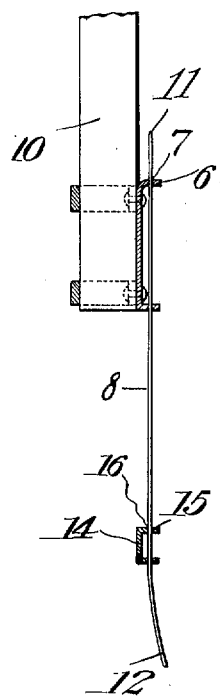
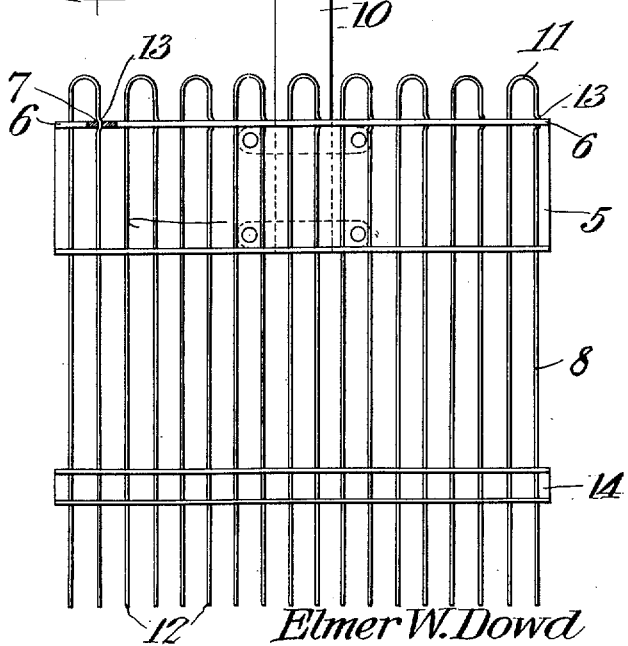
Elmer W. Dowd INVENTOR

UNITED STATES PATENT OFFICE.

ELMER W. DOWD, OF OTTAWA, KANSAS.

RAKE.

No. 853,502.  Specification of Letters Patent.  Patented May 14, 1907.

Application filed August 31, 1906. Serial No. 332,850.

*To all whom it may concern:*

Be it known that I, ELMER W. DOWD, a citizen of the United States, residing at Ottawa, in the county of Franklin and State of Kansas, have invented a new and useful Rake, of which the following is a specification.

This invention relates to a combined rake and has for its object to provide a comparatively simple and inexpensive device of this character principally designed for sweeping or raking grass, leaves and other debris from lawns, and similar grass-plots.

A further object of the invention is to provide a rake the teeth or tines of which are curved laterally and spaced apart by a transverse connecting bar, the latter being slidably mounted on said tines and adjustable vertically of the rake whereby the rigidity of the teeth may be regulated at will.

A further object is to provide a rake the teeth of which are mounted for independent vertical movement on the rake-head thus permitting any particular set of teeth to be raised or lowered independently of the adjacent teeth when using the rake for weeding purposes.

A further object of the invention is to generally improve this class of devices so as to increase their utility, durability and efficiency as well as to reduce the cost of manufacture.

With these and other objects in view the invention consists in the construction and novel combination and arrangement of parts hereinafter fully described, and illustrated in the accompanying drawings, it being understood that various changes in form, proportions and minor details of construction may be resorted to within the scope of the appended claims.

In the accompanying drawings forming a part of this specification: Figure 1 is a front elevation of a rake constructed in accordance with my invention. Fig. 2 is a rear elevation of the same. Fig. 3 is a transverse sectional view taken on the line 3—3 of Fig. 1.

Similar numerals of reference indicate corresponding parts in all of the figures of the drawings.

The improved rake comprises a head 5 preferably formed of a single piece of metal the opposite longitudinal edges of which are bent laterally to form spaced flanges 6 having alined openings 7 formed therein for the reception of the teeth or tines 8.

Secured to the rear face of the plate 5 in any suitable manner as by rivets or similar fastening devices 8 are metal straps 9, an intermediate portion of each of which is spaced from the plate 5 to form a socket for the reception of a handle 10.

The tines 8 are each preferably formed of a single piece of wire bent upon itself as indicated at 11 to form spaced parallel arms the ends of which are bent laterally as indicated at 12 thereby to prevent the teeth or tines from digging up the grass when raking the latter.

The tines 8 are mounted for independent longitudinal movement on the rake-head 5 so that any particular set of tines may be adjusted vertically thereby to vary the width of the rake and thus permit the latter to be used for weeding purposes. One of the parallel arms comprising each tine 8 is provided with an offset or loop 13 which engages the walls of the perforation 7 in one of the flanges 6 thus locking the tines in lowered or operative position.

In order to elevate any particular tine it is merely necessary to exert a straight upward pull on the closed end 11 of the tine thus withdrawing the loop 13 from the adjacent perforation in the head of the rake and permitting the tine to be adjusted longitudinally of the latter.

Extending transversely across the tines 8 and spaced from the head 5 is a connecting bar 14 preferably formed of angle iron and having its opposite flanges 15 provided with alined perforations 16 for the reception of the tines 8. The connecting bar 14 is slidably mounted for longitudinal movement on the tines 8 and is held in engagement therewith by frictional contact so that by adjusting the bar longitudinally of the rake-head the rigidity of the teeth or tines may be regulated at will thus adapting the rake for different purposes.

The device has the function and effect of both a broom and rake and will be found particularly useful for gathering leaves on lawns or for raking flower-beds, weeding gardens, stirring straw in stables and the like.

From the foregoing description it will be seen that there is provided an extremely simple, inexpensive and efficient device admirably adapted for the attainment of the ends in view.

Having thus described the invention what is claimed is:

1. A rake comprising a handle, a plate secured to the handle and provided with spaced perforated flanges, and a plurality of vertically adjustable tines passing through the perforations in the flanges and provided with laterally extending loops engaging the walls of said perforations for locking the tines in lowered position.

2. A rake comprising a plate provided with oppositely disposed perforated flanges, a loop secured to one side of the plate, a plurality of tines each formed of a single piece of metal bent upon itself to form parallel arms the ends of which pass through the perforations in the flanges, a laterally extending loop formed in one of the arms of each tine and adapted to bear against the walls of the perforations, a transverse connecting bar provided with longitudinal flanges having alined perforations formed therein for the reception of the tines, said bar being adjustable longitudinally of the rake, and an operating handle engaging said loop and extending in the same longitudinal plane with the tines.

3. A rake comprising a handle, a plate secured to the handle and provided with spaced perforated flanges, a plurality of vertically adjustable tines passing through the perforations in the flanges and provided with laterally extending loops engaging the walls of the perforations for locking the tines in lowered position, and an operating handle secured to the plate and extending in the same longitudinal plane with the tines.

4. A rake head comprising a handle, a plate secured to and extended transversely of the handle and provided with spaced perforated flanges, a plurality of vertically adjustable tines passing through the perforations in the flanges and provided with laterally extending loops engaging the walls of said perforations for locking the tines in lowered position, a transverse bar slidably mounted on the tines and spaced from the plate, said handle being extended in the same longitudinal plane with the tines.

5. A rake comprising a handle, a plate secured to the handle and having perforations formed therein, a plurality of vertically adjustable tines passing through the perforations in the plate and provided with laterally extending loops engaging the walls of said perforations for locking the tines in lowered position, a transverse bar slidably mounted on the tines and provided with spaced perforated flanges adapted to receive the tines, said handle being secured to the plate and extended in the same longitudinal plane with the tines.

In testimony that I claim the foregoing as my own, I have hereto affixed my signature in the presence of two witnesses.

ELMER W. DOWD.

Witnesses:
  LOGAN H. MAUPIN.
  GEORGE H. MOYER.